United States Patent
Rogers

[11] 3,894,858
[45] July 15, 1975

[54] PREVENTING THERMALLY INDUCED FRACTURE OF CATHODE RAY TUBE BULBS BY APPLICATION OF A THERMAL INSULATOR

[75] Inventor: Melvin F. Rogers, Western Springs, Ill.

[73] Assignee: Zenith Radio Corporation, Chicago, Ill.

[22] Filed: Jan. 4, 1974

[21] Appl. No.: 430,828

[52] U.S. Cl. .............. 65/23; 65/28; 65/41; 65/111; 65/112; 65/155
[51] Int. Cl. .................. C03c 19/00; C03b 25/00
[58] Field of Search ....... 65/28, 23, 113, 112, 348, 65/165, 155, 111, 154, 41

[56] References Cited
UNITED STATES PATENTS

| | | | |
|---|---|---|---|
| 2,656,170 | 10/1953 | Mann | 65/111 X |
| 2,762,166 | 9/1956 | Vent | 65/348 X |
| 2,793,472 | 5/1957 | Heer et al. | 65/23 |
| 2,861,392 | 11/1958 | Vincent | 65/155 X |
| 2,884,312 | 4/1956 | Kuryla | 65/23 X |
| 2,991,591 | 7/1961 | Gabor et al. | 65/115 |
| 3,217,088 | 11/1965 | Steierman | 65/43 X |

Primary Examiner—S. Leon Bashore
Assistant Examiner—Frank W. Miga
Attorney, Agent, or Firm—John H. Coult

[57] ABSTRACT

Method for reducing the likelihood of cathode ray tube glass bulb and bulb component fracture caused by temperature cycling in the cathode ray tube manufacturing process. Temperature gradients between glass exterior surfaces and glass interior, arising during cooling, are locally reduced. In a preferred embodiment, a thermal insulator is applied prior to cooling, to areas of especially low tensile strength in order to locally reduce the rate of surface cooling and thus locally reduce the cooling-induced surface tensile forces.

6 Claims, 13 Drawing Figures

3,894,858
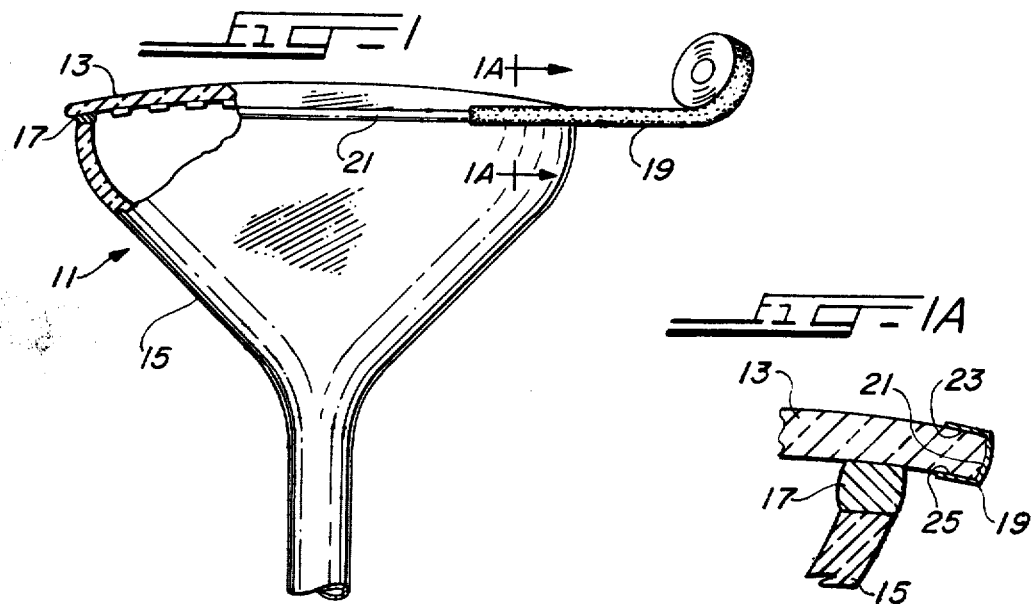
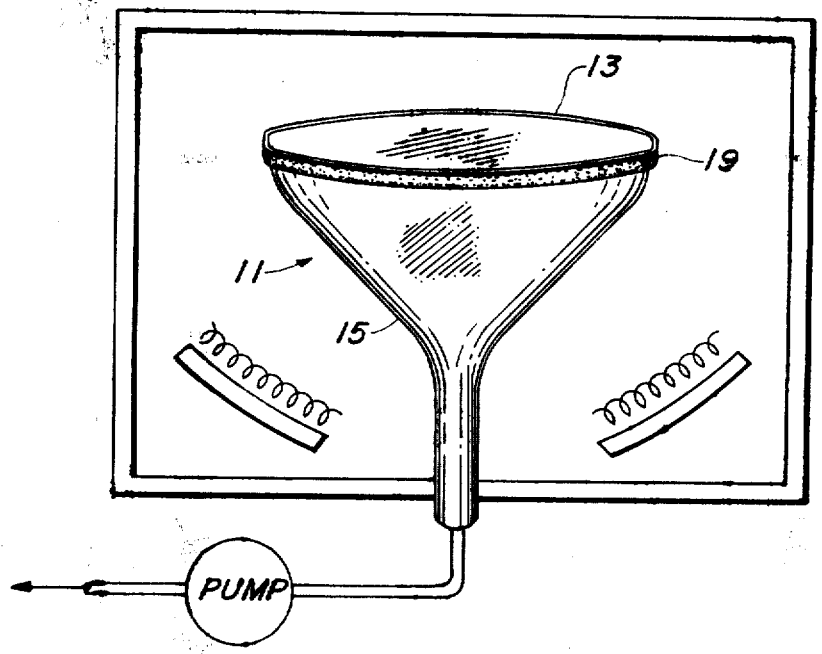

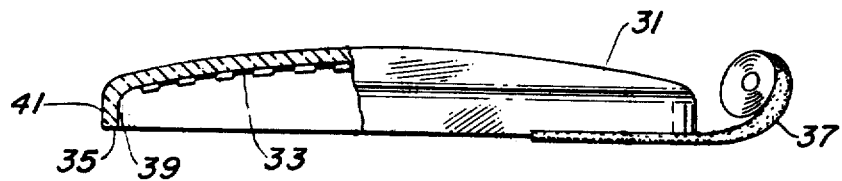
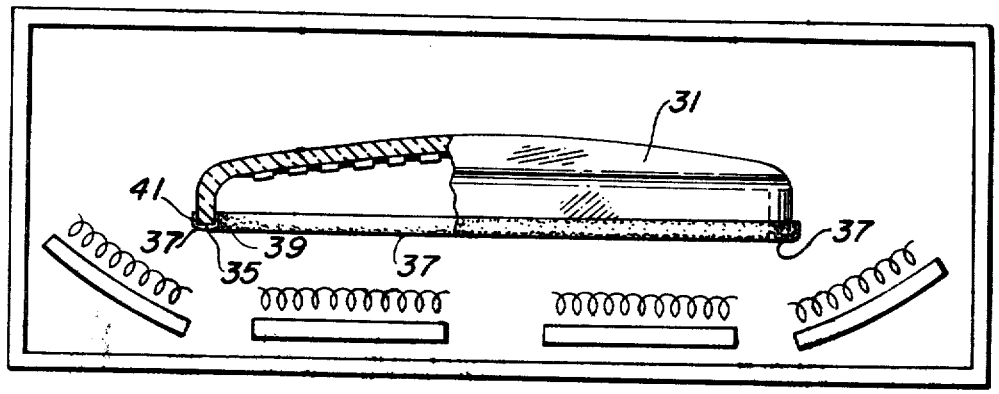
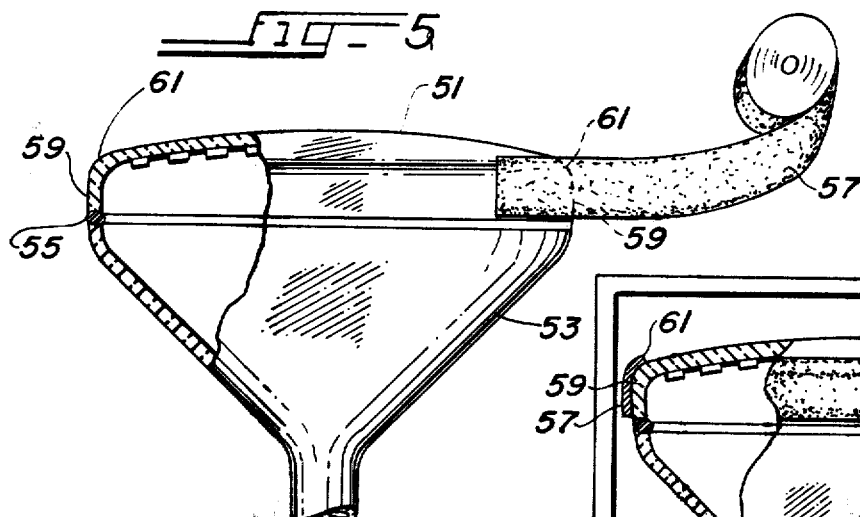
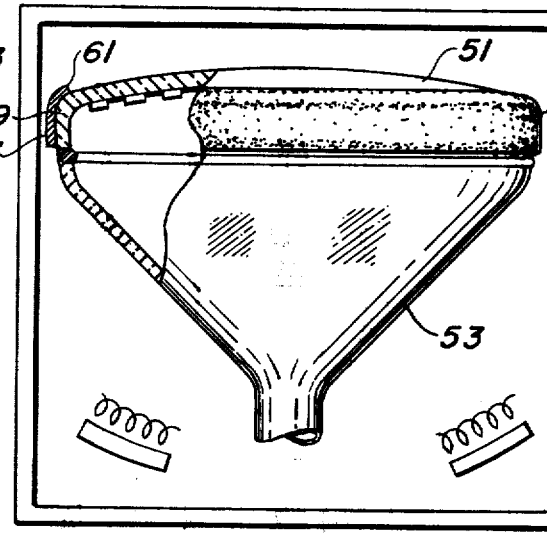

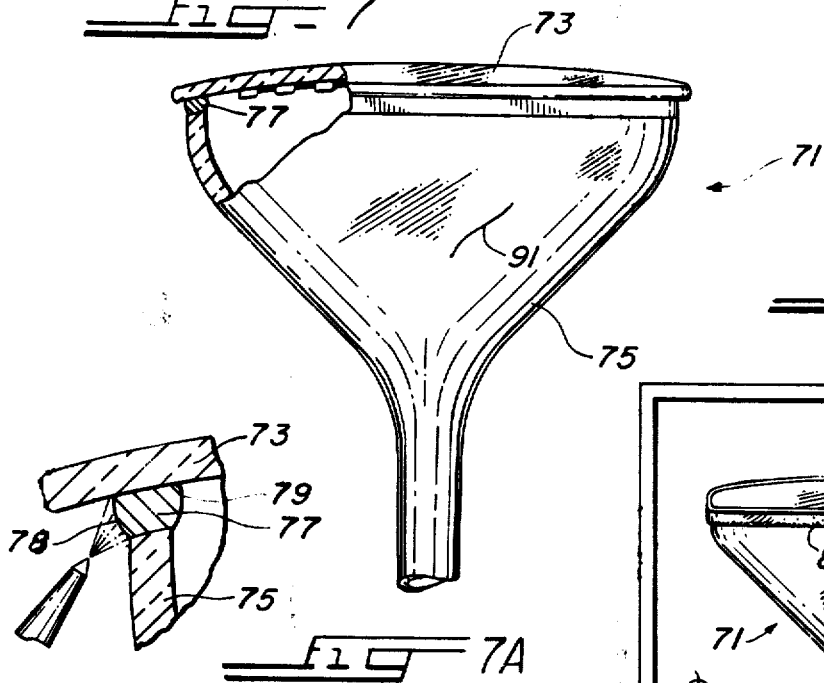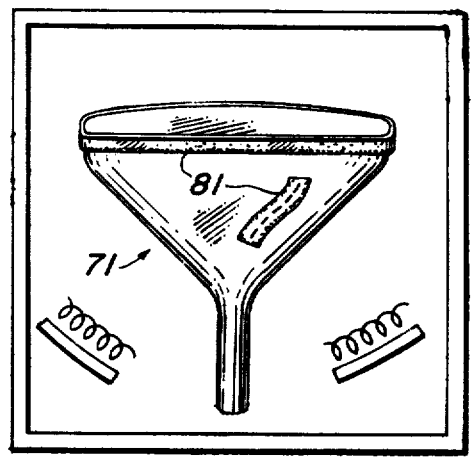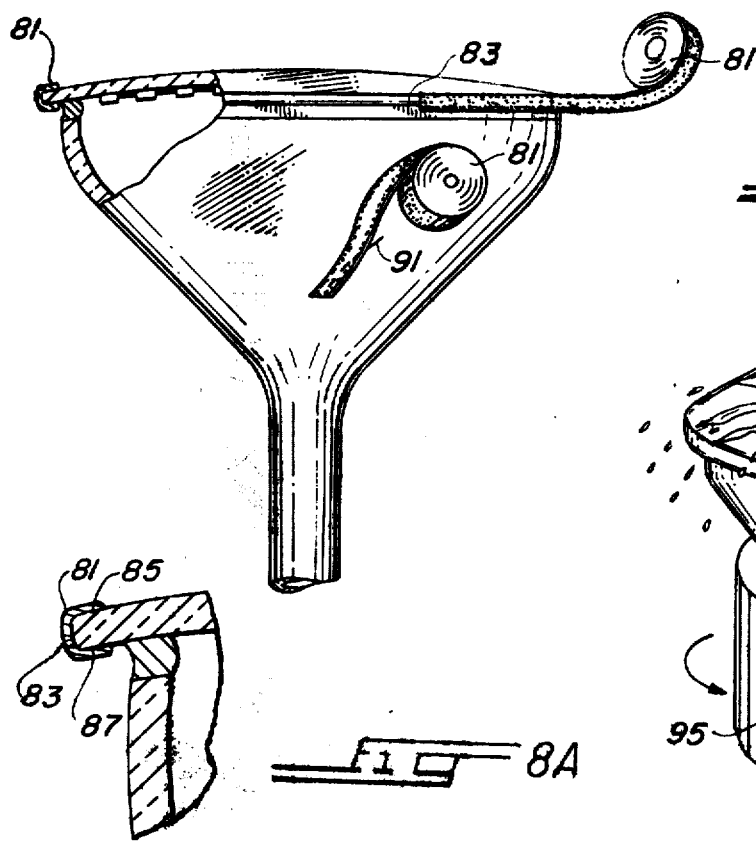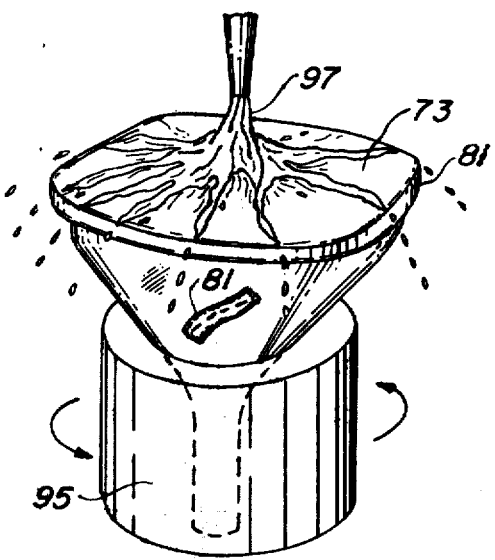

PREVENTING THERMALLY INDUCED FRACTURE OF CATHODE RAY TUBE BULBS BY APPLICATION OF A THERMAL INSULATOR

BACKGROUND OF THE INVENTION

This invention is concerned with reducing occurrences of breakage of television cathode ray tube glass bulbs and bulb components resulting from various temperature changes introduced in manufacturing and salvage processes.

Color television cathode ray tube bulbs include two major components- (i) a glass front panel for, among other things, supporting arrays of cathodo-luminescent phosphor deposits and (ii) a glass funnel member whose large end is eventually sealed to the face panel and whose small end houses at least one electron beam source. Black and white television cathode ray tube bulbs, although taking on the same basic final exterior appearance as color bulbs, do not comprise separate components, but rather are produced as a single integral unit.

During the various processes of cathode ray tube manufacture, glass bulbs and glass bulb components undergo numerous temperature variations which cause glass breakage with the obvious consequence of decreased yield and thus increased manufacturing cost. For instance, color television front panels prior to application of the phosphor arrays, are heated in order to anneal or stress relieve the glass (commonly known as compaction). Also, following application of phosphor arrays and a lacquer film, front panels are subjected to bake-outs; i.e., the front panel is raised to a high temperature which drives out volatile materials. Black and white tubes undergo a similar bakeout process.

A further heating procedure is required to frit seal the front panel to the funnel. The final heating of color and black and white bulbs usually occurs in the thermal exhaust cycle during which the bulb is heated in an oven while being evacuated. However, the thermal exhaust cycle is not always the final heating procedure of the color television cathode ray tube manufacturing process. If, for some reason, the bulb is reopened, as in thermal shock processes to separate and salvage the bulb or tube components, the glass components are again subjected to temperature cycling.

Following each of these heating procedures the bulb or its components must be cooled. It is during this cool down that the fractures generally occur. They are contributorily caused by some defect or weakness on an exposed surface such as a scratch caused by handling. During cool down, the glass goes into a tension mode and the glass is more likely to fracture if it has some exposed surface area of especially low tensile strength. Examples of highly susceptible trouble areas include: (1) the extreme border surface of a skirted front panel (i.e., seal land) during cool down from compaction or bake-out; (2) the extreme border surface of a nonskirted front panel during cool down from compaction, bake-out, frit seal, exhaust cycle and thermal shock during salvage; (3) the outside surfaces of skirt and heel radius of skirted front panels during cool down from compaction, bake-out, frit seal, exhaust cycle and thermal shock during salvage; also, similar surfaces on black and white bulbs during cool down from bake-out and exhaust cycle; (4) the outside surfaces of the funnel and panel during cool down from compaction, bake-out, frit seal, exhaust cycle and thermal shock during salvage; also the outside surfaces of black and white bulbs during cool down from bake-out and exhaust cycle.

Prior art attempts to reduce occurrences of breakage have included increasing the length of time over which the glass bulbs or components are cooled. This obviously results in increased manufacturing time and increased cost.

Other Prior Art

U.S. Pat. No. 3,390,033 — M. K. Brown

OBJECTS OF THE INVENTION

Having seen that television cathode ray tube glass bulbs and bulb components may fracture during cool down from the various heating processes required in the manufacture of television cathode ray tubes, it is a general object of this invention to reduce the likelihood, and thus the frequency, of such breakage and thus reduce the cost of television cathode ray tube manufacture. It is a further object to reduce such frequency of breakage without increasing the time required for cool down. It is another object to reduce the cooling-induced tension in the vicinity of defects.

BRIEF DESCRIPTION OF THE DRAWINGS

FIGS. 1, 1A and 2 show a cathode ray tube bulb, and enlarged partial section thereof, during manufacture in accordance with one application of the principles of the invention;

FIGS. 3 and 4 are side views of a skirted front panel, in process in accordance with another application of the principles of the invention;

FIGS. 5 and 6 are side views of a cathode ray tube bulb in process in accordance with still another application of the principles of the invention; and FIGS. 7, 7A, 8, 8A, 9 and 10 are side and perspective views of a cathode ray tube bulb in process in accordance with a salvage application of the principles of the invention.

DESCRIPTION OF THE PREFERRED EMBODIMENT

As pointed out above, cathode ray tube glass bulbs and bulb components are subjected to numerous temperature cycles during manufacture which produce tension modes in the glass and many times cause it to fracture, particularly if the glass has some exposed surface areas of especially low tensile strength. The drawings and examples below demonstrate specific preferred applications of the present inventive principles for reducing the likelihood of such thermally induced fracture of cathode ray tube glass bulbs and bulb components.

EXAMPLE 1

FIGS. 1, 1A and 2 show an application of the inventive principles to reducing likelihood of fracture of a nonskirted glass front panel due to temperature cycling encountered in evacuating a cathode ray tube glass bulb. The process of bulb evacuation is commonly referred to as the thermal exhaust cycle. FIG. 1 shows a cathode ray tube glass bulb 11 comprising a nonskirted glass front panel 13 joined to a glass funnel 15 by means of frit seal 17. In accordance with this invention, prior to heating, a thermal insulator 19, shown in FIGS. 1 and 1A, is applied to the front panel extreme border surface 21 so as to cover the extreme border surface and slightly overlap onto adjoining front panel top and bottom surfaces 23, 25. The amount of overlap is not critical; satisfactory results have been obtained with an overlap onto the top surface of about ¼–½ inch and onto the bottom surface of about ¼–½ inch. Although any surface-conformable insulator of sheet or other form capable of withstanding approximately 420°C is satisfactory, a single layer of asbestos paper approximately 0.015 inch thick is presently preferred for use as the thermal insulator. Before application, which may be manual, the paper is first water moistened to assure that it conforms to the extreme border surface and adjacent surface. Other ways of, and materials for, thermally insulating the surfaces of concern are possible and may be more suitable for certain mass production purposes. For instance, a belt or "doughnut" could be pre-formed to encircle the panel, and grooved or channeled at its inner periphery so as to mate with the panel extreme border in a fashion similar to that of the applied asbestos paper shown in FIGS. 1, 1A and 2. The belt could be split at one or more points and employ a buckle at each split for cinching. Materials suitable for such pre-formed insulations are varied and include: (i) fiberglass, (ii) a vermiculite composition employing an appropriate binder.

As shown in FIG. 2 the bulb with extreme border-applied-insulator is then evacuated while being subjected to approximately 420°C. After completing the evacuation and bulb sealing, the temperature is decreased in stages until bulb temperature, as measured at a non-thermally-insulated bulb surface, reaches about 180°C. The bulb is then removed from the heat and permitted to cool in room ambient conditions. After cooling is completed, the thermal insulator is removed and remaining manufacturing processes continued.

Although the process described in this example has been particularly described in relation to the thermal exhaust cycle, it should be apparent that the same process is applicable whenever a non-skirted front panel is subjected to high temperatures and subsequently cooled. Specifically, other examples of the above described process application include employing the thermal insulator on the front panel extreme border during compaction and cool down, during bake-out and cool down, and during frit sealing and cool down.

EXAMPLE 2

This example involves bake-out of a more conventional skirted front panel; this application is quite similar in many ways to that of Example 1. FIG. 3 shows a skirted front panel 31 including a previously applied phosphor screen 33. At this stage of manufacture, before frit sealing to a funnel, the panel seal land 35 is exposed and subject to similar breakage problems as the non-skirted front panel extreme border surface of Example 1.

As shown in FIG. 3, prior to bake-out heating, a thermal insulator 37 is applied to the front panel seal land 35 so as to cover the seal land and slightly overlap onto adjoining inside 39 and outside 41 skirt surfaces. Again, the amount of overlap is not critical but, it is believed that for best results, the insulator 37 should usually extend onto the skirt surfaces about ¼–½ inch. Although any surface-conformable insulator capable of withstanding approximately 420°C is satisfactory, a single layer of asbestos paper approximately 0.015 inch thick is presently preferred for use as the thermal insulator in this application also. Before application, which is presently manual, the paper is first water moistened to assure that it conforms to seal land and adjacent surfaces. As in Example 1, other ways of and materials for, insulating may be employed. For instance, in the present example an insulating and seal-land-mating mold could be pre-formed roughly in the shape which the insulating paper takes in FIGS. 3 and 4. The panel and mold could be quickly mated.

As shown in FIG. 4, the front panel with the insulator 37 applied to the seal land 35 is then baked at temperatures up to approximately 420°C so as to drive out volatile materials. After completing the bake-out, the temperature is decreased in stages until panel temperature, as measured at a non-thermally-insulated panel surface, reaches about 180°C. The panel is then removed from the heat and permitted to cool in room ambient conditions. After cooling is completed the thermal insulator is removed and remaining manufacturing processes continued.

Although the process described in this example has been particularly described in relation to the temperature cycling associated with panel bake-out, it should be apparent that the same process is applicable whenever a skirted front panel having an exposed seal land is subjected to high temperatures and subsequently cooled. Specifically, another example of the above described process application includes employing the thermal insulator on the front panel seal land during compaction and cool down.

EXAMPLE 3

FIGS. 5 and 6 represent an application of the inventive principles to reducing the likelihood of skirt-related and heel radius-related fractures due to temperature cycling of a skirted face panel. The figures show a skirted face panel 51 joined to a glass funnel 53 by means of a frit seal 55 and thus specifically represent the use of the following procedure in temperature cycling processes occurring during or subsequent to component joining, such as frit sealing and thermal exhaust evacuation. However, the procedure is equally applicable to temperature cycling processes occuring prior to component joining, such as compaction and bake-out. Moreover, since black and white bulbs possess similar surface areas, the procedure is also applicable to these bulbs during bake-out and exhaust cycle.

As shown in FIG. 5, prior to heating, a thermal insulator 57 is applied to the upper skirt and heel radius exterior surfaces, 59 and 61, by forming a belt of the insulator around the upper skirt which slightly overlaps onto the adjoining heel radius exterior surface 61. Although any surface-conformable insulator capable of withstanding approximately 420°C is satisfactory, again a single layer of asbestos paper approximately .015 inch thick is presently preferred for use as the thermal insulator. Before application, which may be manual, the paper is first water moistened to assure that it conforms to skirt and heel radius exterior surfaces. As in Example 1, other forms of insulating are contemplated. A pre-formed mold, of appropriate insulative material, resembling the FIG. 6 insulator application and conforming to the surfaces as illustrated in FIGS. 5 and 6 could replace the asbestos paper.

As shown in FIG. 6, the panel including the insulator belt is then subjected to approximately 420°C. Afterwards the temperature is decreased in stages until glass temperature, as measured at a non-thermally-insulated glass surface, reaches about 180°C. The bulb is then removed from the heat and permitted to cool in room ambient conditions. After cooling is completed the thermal insulator is removed and remaining manufacturing processes continued.

EXAMPLE 4

FIGS. 7 through 10 illustrate an application of the inventive principles to reducing likelihood of fracture of a non-skirted glass front panel and attached glass funnel due to temperature cycling associated with salvaging components of a cathode ray tube glass bulb having a discrete faceplate or front panel. Specifically depicted is a method of separating a nonskirted front panel frit sealed to a funnel.

FIG. 7 shows a cathode ray tube glass bulb 71 comprising a non-skirted glass front panel 73 joined to a glass funnel 75 by means of a frit seal 77. As shown in FIG. 7, and particularly in the FIG. 7A magnified view, the frit seal includes an outer bead portion 78 and an inner bead portion 79.

To separate the two glass components, first, as shown in FIG. 7, the outer bead portion 78 is removed, preferably by acid etching. When the outer bead portion is removed, as shown in FIG. 8, a thermal insulator 81 is applied according to this invention to the front panel extreme border surface 83 so as to cover the extreme border surface and slightly overlap onto adjoining front panel top 85 and bottom 87 surfaces. See FIG. 8A. The amount of overlap is not critical but satisfactory results have been obtained with the insulator extending onto the top surface about ¼-½ inch and onto the bottom surface about ¼-½ inch. Also, bulb surface defects, such as the scratch 91 illustrated on the funnel surface, are covered with patches comprising strips of the thermal insulator 81. Although any surface conformable insulator capable of withstanding approximately 80°C is satisfactory, several layers of a fabric base adhesive tape is presently preferred for use as the thermal insulator. Other means of providing such insulation are contemplated. For instance, a large elastic or rubber band could be stretched around the panel periphery and would naturally conform to the surfaces of concern, providing the requisite insulation. As shown in FIG. 9 the bulb 71 including the applied insulator 81 is then heated to between approximately 50°C and 80°C. While at this temperature the bulb is mounted vertically, as shown in FIG. 10, with the front panel 73 in the up position preferably on a rotatable table 95. A fluid 97 at approximately 10° to 20°C is then flowed in the downward direction onto the front panel, preferably while the turntable is rotating. The thermal shock results in a fracture of the frit seal. Following fracture of the frit seal, fluid flow is stopped. Once the entire bulb has cooled sufficiently, the thermal insulator is removed and remaining manufacturing processes continued.

Although the process described in this example has been particularly described in relation to bulbs including a non-skirted front panel, it should be apparent that the part of the process applicable to covering surface defects, such as scratch 91, is independent of the front panel shape and is thus applicable to salvage processes according to this invention in which one of the bulb components is a conventional skirted front panel.

In each of the above examples, the likelihood of fracture is reduced without increasing the cooling period. In some instances both a reduction in frequency of fracture and a reduction of cooling period may be achieved. A common rationale underlies the results achieved in all examples. When the glass is cooled, following any of the desired heating processes, the exposed surfaces normally cool faster than the glass interior. Temperature gradients are produced between the surfaces and the interior of the glass. In the panel extreme border surface examples, the thermal gradient of concern is between the extreme border surface and the interior of the glass panel. In the other examples, such as funnel exterior surface and skirt and heel radius surfaces, the gradient of concern is through-wall. These temperature gradients in turn generate tensile forces at the glass surface. Glass, even when perfect and homogeneous, is weak in the tension mode, but is particularly susceptible to fracture due to these tensile forces if it has some surface area of especially low tensile strength such as a scratch or other defect. For instance, even minute defects at the extreme border surface of a non-skirted face panel will, on cooling from high temperatures, result in fracture due to circumferential tension at the panel periphery.

Application of the thermal insulator over the susceptible surface prior to cooling locally reduces the rate of cooling and consequently locally reduces the cooling-/induced tensile forces. The result is reduced likelihood of glass fracture. The major portion of the bulb or bulb component remains uninsulated and continues to cool at a normal rate which depends on the surrounding conditions. In fact since many of the temperature cycle periods are designed to accommodate the susceptible surfaces, insulating the surfaces during cooling can permit shorter thermal cycles.

It is to be understood that the above-described examples are merely illustrative of the application of the principles of the invention. Numerous other arrangements may be readily devised by those skilled in the art which will embody the principles of the invention and fall within the spirit and scope thereof.

What is claimed is:

1. In a television cathode ray tube manufacturing process of exhausting or frit sealing a cathode ray tube glass bulb of a type comprising a non-skirted glass front panel and a glass funnel, or in a process of annealing or baking out said front panel, wherein in said process said bulb is heated to temperatures above 400°C and subsequently cooled, said process producing a temperature gradient between the front panel extreme border surface and more remote inner portions of the front panel glass which generates circumferential tension at the front panel extreme border, a method for reducing said circumferential tension to lessen the likelihood of front panel fracture comprising applying prior to or during said cooling a thermal insulator over the front panel extreme border surface and vicinity so as to locally reduce the rate of glass surface cooling.

2. A process as defined in claim 1 wherein said application of thermal insulator comprises applying one or more layers of a thermally insulative sheet to said extreme border surface and conforming said layers to said extreme border surface and vicinity.

3. A process as defined in claim 2 wherein said thermally insulative sheet comprises water moistened asbestos paper.

4. In a television cathode ray tube manufacturing process of heating a glass front panel having at least one exposed extreme border surface to temperatures above 400°C and subsequently cooling said panel, thus producing a temperature gradient between the front panel extreme border surface and more remote inner portions of the front panel glass which causes tension at the front panel extreme border surface, a method for reducing said tension to thus lessen the likelihood of front panel fracture, said method comprising applying prior to or during said cooling a thermal insulator over the front panel extreme border surface and vicinity so as to locally reduce the rate of glass surface cooling.

5. A process as defined in claim 4 wherein said application of thermal insulator comprises applying, prior to or during heating, one or more layers of a thermally insulative sheet to said extreme border surface and conforming said layers to said extreme border surface and vicinity.

6. A process as defined in claim 5 wherein said thermally insulative sheet comprises water moistened asbestos paper.

* * * * *